Patented Mar. 14, 1939

2,150,421

UNITED STATES PATENT OFFICE 2,150,421

ANTIOXIDANT

Howard I. Cramer, Cuyahoga Falls, Ohio, assignor to Wingfoot Corporation, Wilmington, Del., a corporation of Delaware No Drawing. Application June 25, 1935,
Serial No. 28,295

6 Claims. (Cl. 18—50)

This invention relates to antioxidants for rubber and, more particularly, to secondary amines in which one aromatic substituent has been dihydrogenated.

Age resisters or antioxidants are ordinarily incorporated in or otherwise applied to rubber to retard deterioration, the secondary aromatic amines being effective for this purpose. It has now been found that diaryl amines in which one aryl group consists of a condensed nucleus which has been dihydrogenated also constitute valuable age resisters, especially for the prevention of flex cracking. These secondary amines, characterized by the presence of a dihydrogenated nucleus of the aforementioned type, show little tendency to bloom on the surface of the rubber article in which they have been incorporated and are readily dispersed in the unvulcanized rubber.

The herein defined class of age resisters includes those secondary amines in which there is present one normal aromatic nucleus, such as phenyl, and one hydrogenated condensed nucleus derived from a compound containing two additional hydrogen atoms, such as dihydro naphthalene or dialin, both the 1, 2 and 1, 4 modifications of this latter compound being useful. For example, there may be used in rubber phenyl beta dihydro naphthylamine, phenyl alpha dihydro naphthylamine, tolyl dihydro naphthylamine, xylyl dihydro naphthylamine, cumyl dihydro naphthylamine, naphthyl dihydro naphthylamine, etc. Both the alpha and beta modifications of the naphthol or dihydro naphthyl substituents may be present in the foregoing compounds and the amino nitrogen may be attached either to the hydrogenated ring or to an unhydrogenated ring of the naphthyl or other condensed nucleus to form AR and AC compounds.

These other dihydrogenated condensed nuclei which may also be present in the secondary amines embraced within the scope of the present invention are exemplified by such compouds as phenyl dihydro anthracyl amine, xylyl dihydro anthracyl amine, tolyl dihydro anthracyl amine, naphthyl dihydro anthracyl amine, and others, such as secondary amines including the hydrindene, or indane nucleus. These latter may be illustrated by the compound phenyl hydrindene amine.

The secondary amines herein described as rubber antioxidants are those compounds in which the amio group has been substituted by an aryl group which carries the normal number of hydrogen atoms, such as six hydrogen atoms in the case of benzene, and by a hydrogenated aryl nucleus of the condensed type, i. e., a nucleus containing two or more rings which are in fused relationship one to the other, such as the radicals of dihydro naphthalene, dihydro anthracene, etc. The second substituent, accordingly, is derived from a compound which carries two more hydrogen atoms than are present in the parent compound. Of course, in the secondary amine, the radical or residue will have one hydrogen atom replaced by the amino group and will carry but one more hydrogen atom than would be present in the parent condensed nucleus. For illustration, dihydro naphthalene has the formula $C_{10}H_{10}$, carrying two more hydrogen atoms than naphthalene itself, but the dihydro naphthyl substituent will have the formula $C_{10}H_9$ —carrying one more hydrogen atom than is present in naphthalene itself.

These age resisters or antioxidants may be prepared by catalytic hydrogenation under pressure of the corresponding secondary diaryl amine at elevated pressures and temperatures. Various catalysts may be used to control and promote the reaction, such as catalysts of nickel and chromite. Synthetic methods may also be used to produce the compounds.

The age resisters may be applied to the rubber in any feasible manner, as by incorporating the same in a rubber mix of vulcanization characteristics while the latter is on the mill, or by applying the antioxidant to the surface of the rubber article in the unvulcanized condition, or by addition to rubber latex before its coagulation. A suitable test formula for determining the effect of the antioxidant in rubber, is made up as follows:

| | Parts |
|---|---|
| Extracted pale crepe | 100 |
| Zinc oxide | 5 |
| Sulphur | 3 |
| Hexamethylene tetramine | 1 |
| Stearic acid | 1.5 |
| Antioxidant | 1.0 |

It will be understood that the term "rubber" is employed in the claims in an inclusive sense to comprise rubber, synthetic rubber, reclaimed rubber, balata, gutta percha, rubber isomers, and similar products, whether or not the same have been admixed with fillers, pigments, vulcanizing agents and the like.

While there have been described above certain preferred embodiments of the invention, the same are for purposes of illustration and the invention is not limited thereto. It will be apparent that numerous changes may be made, as pointed out herein, in the chemicals employed without departing from the inventive concept, and it is intended that the patent shall cover, by suitable expression in the appended claims, all features of patentable novelty residing in the invention.

What I claim is:

1. The process of improving the age-resisting characteristics of rubber which comprises treating the same with a dihydro naphthyl aryl secondary amine.

2. The process of treating rubber which comprises incorporating in a rubber composition of vulcanization characteristics an age resister consisting of a phenyl dihydro naphthylamine.

3. The process of treating rubber which comprises incorporating in a rubber composition of vulcanization characteristics an age resister consisting of a dihydro beta naphthyl phenyl amine.

4. The process of treating rubber which comprises incorporating in a rubber composition of vulcanization characteristics an age resister consisting of a dihydro beta naphthyl phenyl amine.

5. A rubber composition including rubber and a dihydro naphthyl aryl secondary amine.

6. A rubber composition including rubber and a dihydro beta naphthyl phenyl amine.

HOWARD I. CRAMER.

CERTIFICATE OF CORRECTION.

Patent No. 2,150,421.  March 14, 1939.

HOWARD I. CRAMER.

It is hereby certified that error appears in the printed specification of the above numbered patent requiring correction as follows: Page 1, first column, line 53, for "amio" read amino; page 2, second column, line 10, claim 4, for "a dihydro" read ar dihydro; and that the said Letters Patent should be read with this correction therein that the same may conform to the record of the case in the Patent Office.

Signed and sealed this 16th day of May, A. D. 1939.

Henry Van Arsdale (Seal)  Acting Commissioner of Patents.